(12) United States Patent
Kwon et al.

(10) Patent No.: US 11,706,128 B2
(45) Date of Patent: Jul. 18, 2023

(54) METHOD AND APPARATUS FOR MULTI-LINK DATA TRANSMISSION

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 164 days.

(21) Appl. No.: 17/139,619

(22) Filed: Dec. 31, 2020

(65) Prior Publication Data

US 2021/0211375 A1 Jul. 8, 2021

Related U.S. Application Data

(60) Provisional application No. 62/992,059, filed on Mar. 19, 2020, provisional application No. 62/957,156, filed on Jan. 4, 2020.

(51) Int. Cl.
*H04L 45/24* (2022.01)
*H04W 72/12* (2023.01)

(52) U.S. Cl.
CPC ......... *H04L 45/24* (2013.01); *H04W 72/1257* (2013.01)

(58) Field of Classification Search
CPC .. H04L 45/24; H04W 72/121; H04W 72/1257
See application file for complete search history.

(56) References Cited

U.S. PATENT DOCUMENTS

| 10,153,857 | B1 * | 12/2018 | Chu | ...................... H04W 72/21 |
| 2011/0116401 | A1 * | 5/2011 | Banerjea | ............... H04W 74/08 |
| | | | | 370/252 |

(Continued)

FOREIGN PATENT DOCUMENTS

EP 3790346 A1 * 3/2021 .......... H04W 74/002

OTHER PUBLICATIONS

IEEE, "IEEE P802.11ax™/D3.1", Draft Standard for Information technology—Telecommunications and information exchange between systems Local and metropolitan area networks Specific requirements, Feb. 2020, 4649 pgs.

(Continued)

*Primary Examiner* — Kevin D Mew

(57) ABSTRACT

Embodiments of a method and an apparatus for multi-link data transmission are disclosed. In an embodiment, a method of multi-link communications involves at a first MLD that supports a first link, link1, and a second link, link2, transmitting a first frame during a first Transmission Opportunity (TXOP) on link1, and a second frame during a second TXOP on link2, simultaneously to a second MLD, receiving, at the first MLD, a first response frame to the first frame transmitted on link1 after a transmission end time of the first frame, identifying, at the first MLD, that a response frame to the second frame transmitted on link2 was not received after the transmission end time of the second frame, and transmitting, at the first MLD, a third frame on link1 and a fourth frame on link2 simultaneously, after receiving the first response frame on link1.

20 Claims, 11 Drawing Sheets

(56) References Cited

U.S. PATENT DOCUMENTS

| | | | |
|---|---|---|---|
| 2021/0076419 A1* | 3/2021 | Naribole | H04W 56/001 |
| 2021/0144589 A1* | 5/2021 | Seok | H04W 28/085 |
| 2021/0144698 A1* | 5/2021 | Kwon | H04W 28/0215 |
| 2021/0266891 A1* | 8/2021 | Chu | H04W 74/00 |
| 2021/0282119 A1* | 9/2021 | Asterjadhi | H04W 88/08 |
| 2021/0315025 A1* | 10/2021 | Seok | H04L 1/0008 |
| 2021/0337564 A1* | 10/2021 | Kwon | H04W 72/1263 |
| 2021/0352722 A1* | 11/2021 | Xin | H04L 1/1685 |
| 2021/0377856 A1* | 12/2021 | Chu | H04W 72/0446 |
| 2022/0312506 A1* | 9/2022 | Xia | H04W 72/1205 |

OTHER PUBLICATIONS

IEEE, "IEEE P802.11ax™/D6.0", Draft Standard for Information technology—Telecommunications and information exchange between systems Local and metropolitan area networks Specific requirements, Nov. 2019, 780 pgs.

* cited by examiner

METHOD AND APPARATUS FOR MULTI-LINK DATA TRANSMISSION

CROSS-REFERENCE TO RELATED APPLICATIONS

This application is entitled to the benefit of U.S. Provisional Patent Application Ser. No. 62/957,156, filed on Jan. 4, 2020, and U.S. Provisional Patent Application Ser. No. 62/992,059, filed on Mar. 19, 2020.

BACKGROUND

In multi-link communications, a multi-link device, e.g., an AP multi-link logical device (MLD) or an AP multi-link logical entity (MLLE), transmits data to and from another multi-link device, e.g., an STA multi-link device (STA MLD) or an STA multi-link logical entity (STA MLLE), via one or more communication links. For example, a wireless AP multi-link device may wirelessly transmit data to one or more wireless stations in a non-AP multi-link device via one or more wireless communication links. In such multi-link communications, there may be instances when at least one of the links loses connectivity, which can lead to reduced network efficiency, limit bandwidth, and increase latency.

SUMMARY

Embodiments of a method and an apparatus for multi-link data transmission are disclosed. In an embodiment, a method of multi-link communications involves at a first MLD that supports a first link, link1, and a second link, link2, transmitting a first frame during a first Transmission Opportunity (TXOP) on link1, and a second frame during a second TXOP on link2, simultaneously to a second MLD, receiving, at the first MLD, a first response frame to the first frame transmitted on link1 after a transmission end time of the first frame, identifying, at the first MLD, that a response frame to the second frame transmitted on link2 was not received after the transmission end time of the second frame, and transmitting, at the first MLD, a third frame on link1 and a fourth frame on link2 simultaneously, after receiving the first response frame on link1.

In an embodiment, the transmission end time of the first frame and the transmission end time of the second frame are within a first predetermined time.

In an embodiment, the third frame is transmitted at a second predetermined time of at least one of SIFS and PIFS after the reception of the first response frame.

In an embodiment, the method further involves identifying, at the first MLD, that link2 is idle for a third predetermined time before the transmission of the fourth frame.

In an embodiment, the third predetermined time is Point Coordination Function (PCF) Interframe Space (PIFS).

In an embodiment, transmitting the third frame on link1 and the fourth frame on link2 simultaneously after receiving the first response frame on link1 involves transmitting the third frame and the fourth frame within a predetermined time interval of each other.

In an embodiment, at least the first MLD or the second MLD is operating in synchronous mode operation in response to at least one of the following conditions: (i) the first MLD is a Simultaneous Transmit/Receive (STR) MLD and the second MLD is a non-STR MLD, and (ii) the first MLD is a non-STR MLD and the second MLD is a STR MLD.

In an embodiment, after transmitting the second frame at the first MLD further involves monitoring, at the first MLD, a wireless medium of link2 to identify link2 as an idle channel.

An embodiment of a first MLD is also disclosed. The MLD includes a processor configured to communicate with a second MLD via a first link, link1, and a second link, link2, transmit a first frame during a first TXOP on link1, and a second frame during a second TXOP on link2 simultaneously to a second MLD, receive a first response frame to the first frame transmitted on link1 a second predetermined time after a transmission end time of the first frame, identify that a response frame to the second frame transmitted on link2 was not received after the transmission end time of the second frame, and transmit a third frame on link1 and a fourth frame on link2 simultaneously after receiving the first response frame on link1.

In an embodiment, the transmission end time of the first frame and the transmission end time of the second frame is within a first predetermined time.

In an embodiment, the third frame is transmitted at a second predetermined time of at least one of SIFS and PIFS after the reception of the first response frame.

In an embodiment, the first MLD identifies that link2 is idle for a third predetermined time before the transmission of the fourth frame.

In an embodiment, the third predetermined time is Point Coordination Function (PCF) Interframe Space (PIFS).

In an embodiment, transmission of the third frame on link1 and the fourth frame on link2 simultaneously after receiving the first response frame on link1 involves transmitting the third frame and the fourth frame within a predetermined time interval of each other.

In an embodiment, at least the first MLD or the second MLD is operating in synchronous mode operation in response to at least one of (i) the first MLD is a Simultaneous Transmit/Receive (STR) MLD and the second MLD is a non-STR MLD, and (ii) the first MLD is a non-STR MLD and the second MLD is a STR MLD.

In an embodiment, transmission of the second frame at the first MLD further involves, at the first MLD, a monitor of a wireless medium of link2 to identify link2 as an idle channel.

Another embodiment of a method of multi-link communications is disclosed. The method involves at a first MLD that supports a first link, link1, and a second link, link2, transmitting a first frame during a first TXOP on link1, and a second frame during a second TXOP on link2 to a second MLD, wherein a transmission end time of Physical Protocol Data Units (PPDUs) carrying the first frame and the second frame is aligned within a first predetermined time, and wherein the first frame solicits a first immediate response frame and the second frame solicits a second immediate response frame, receiving, at the first MLD, the first immediate response frame on link1, identifying, at the first MLD, that an immediate response frame to the second frame transmitted on link2 was not received after the transmission end time of the second frame, transmitting, at the first MLD, a third frame on link1 at a second predetermined time after receiving the first immediate response frame, and transmitting, at the first MLD, a fourth frame on link2 when the first MLD identifies that link2 is idle.

In an embodiment, transmitting, at the first MLD, the fourth frame on link2 involves at least one of (i) transmitting, at the first MLD, the fourth frame on link2 at the second predetermined time after an expected end time of a reception of the second immediate response frame in response to failing to identify, at the first MLD, a start of a PPDU in a third predetermined time after the transmission of the second frame, and (ii) transmitting, at the first MLD, the fourth frame on link2 a fourth time after the end of a PPDU reception in response to identifying, at the first MLD, the start of the PPDU in the third predetermined time after the transmission of the second frame but failing to recognize, at the first MLD, the second immediate response frame.

In an embodiment, the first, second, third, and fourth predetermined times include at least one of (i) the first predetermined time is equal to or less than Short Interframe Space (SIFS), (ii) the second predetermined time is at least one of SIFS and Point Coordination Function (PCF) Interframe Space (PIFS), (iii) the third predetermined time is aSIFSTime+aSlotTime+aRxPHYStartDelay, and (iv) the fourth predetermined time is PIFS.

In an embodiment, at least the first MLD or the second MLD is operating in synchronous mode operation in response to at least one of (i) the first MLD is a Simultaneous Transmit/Receive (STR) MLD and the second MLD is a non-STR MLD, and (ii) the first MLD is a non-STR MLD and the second MLD is a STR MLD.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
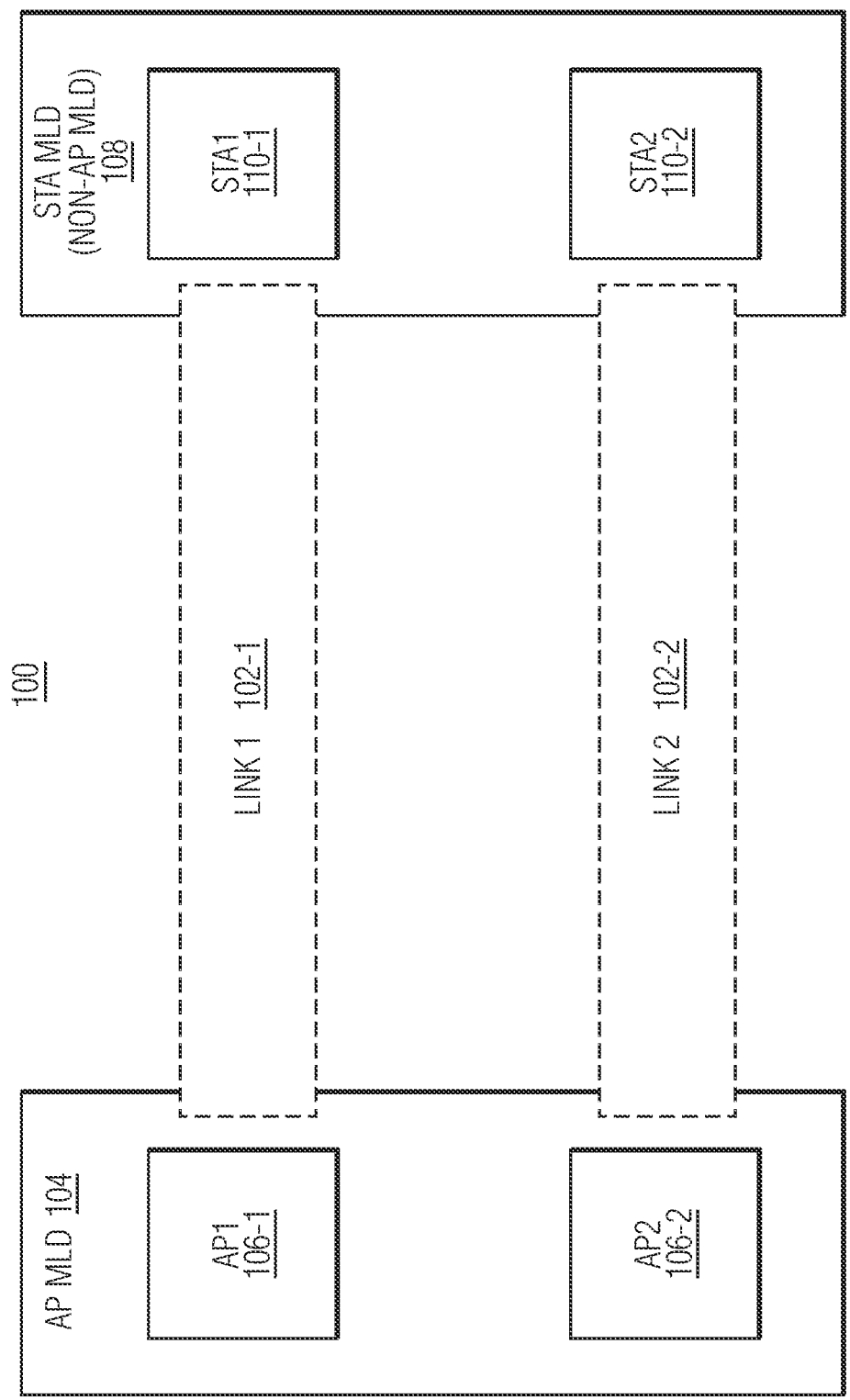
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

To effectively transmit data between multiple multi-link devices, an access point (AP) multi-link device may transmit data frames on one link or on multiple links. Each data frame transmitted may experience a collision, not be received, or be received and not decoded, which may be otherwise better transmitted. Consequently, unsuccessfully transmitting data frames across multiple links between multi-link devices can reduce network efficiency, limit bandwidth, and increase latency. By improving data frame transmission between multi-link devices, multi-link communication systems can achieve faster data transmission, enhanced network capabilities, and increased efficiency.

FIG. 1 depicts a multi-link communications system 100 that includes one AP multi-link device, which is implemented as an AP MLD 104, and one non-AP STA multi-link device, which is implemented as an STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two access points as APs 106-1 and 106-2. The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 106-1 or 106-2 of the AP MLD 104 may operate in a different frequency band. For example, the AP 106-1 may operate in 2.4 gigahertz (GHz) frequency band and the AP 106-2 may operate in 5 GHz frequency band. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two non-AP stations, which are implemented as STAs 110-1 and 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are wireless devices that wirelessly connect to wireless APs. For example, at least one of the non-AP STAs 110-1 or 110-2 may be a laptop, a desktop personal computer (PC), a mobile phone, or other wireless device that supports at least one WLAN communications protocol. In some embodiments, the non-AP STAs 110-1 and 110-2 are wireless devices compatible with at least one IEEE 802.11 protocol (e.g., the IEEE 802.11be protocol). In some embodiments, the STA MLD has one Media Access Control (MAC) data service interface. In some embodiments, the AP MLD 104 and/or the STA MLD 108 identify which communication links support the multi-link operation during a multi-link operation setup phase and/or exchanges information regarding multi-link capabilities during the multi-link operation setup phase. Each of the non-AP STAs 110-1 and 110-2 of the STA MLD 108 may operate in a different frequency band. For example, the non-AP STA 110-1 may operate in 2.4 GHz frequency band and the non-AP STA 110-2 may operate in 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links 102-1 and 102-2. For example, each of the non-AP STAs 110-1 or 110-2 communicates with an AP 106-1 or 106-2 via corresponding communication links 102-1 or 102-2. Although the STA MLD 108 is shown in FIG. 1 as including two non-AP STAs, other embodiments of the STA MLD 108 may include more than two non-AP STAs. In addition, although the AP MLD 104 communicates (e.g., wirelessly communicates) with the STA MLD 108 via multiple links 102-1 and 102-2 in other embodiments, the AP MLD 104 may communicate (e.g., wirelessly communicates) with the STA MLD 108 via more than two communication links.

Figure 2:
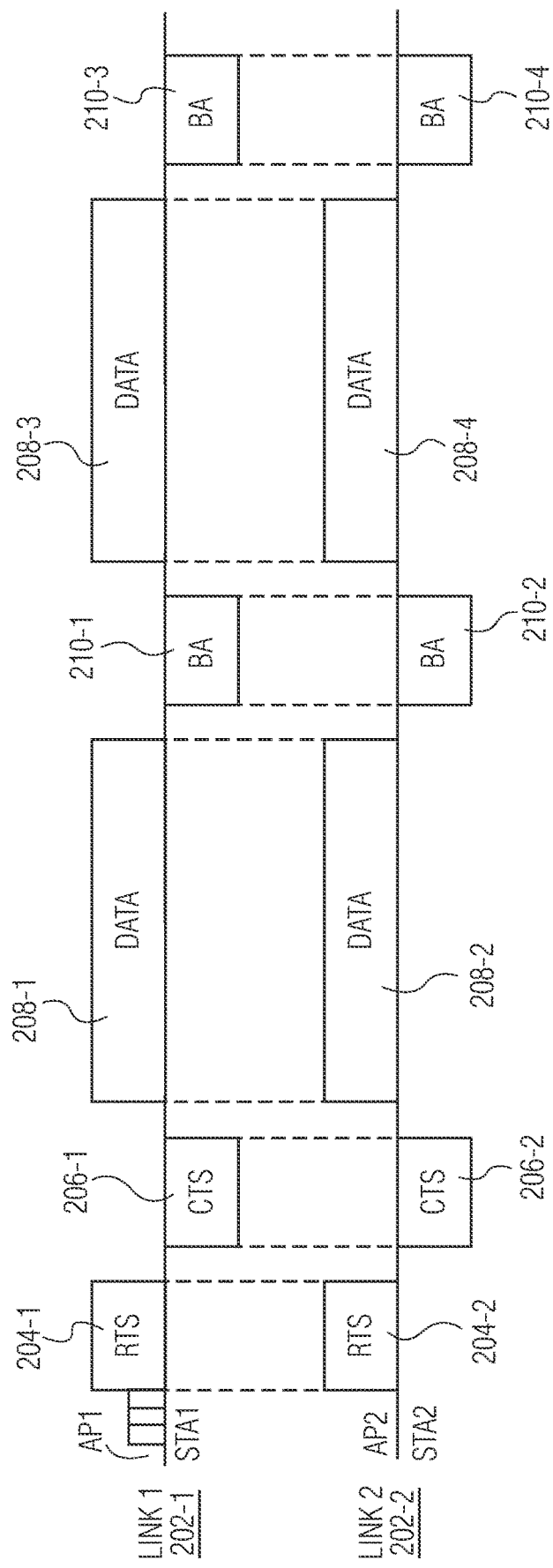
FIG. 2 illustrates an example of a technique for transmitting data that can be used in the multi-link communications system depicted in FIG. 1.

To effectively transmit data for multi-link operations, a multi-link device (MLD) may have a limitation on simultaneous transmit/receive capability on different links. For example, when two different links (e.g., link1 and link2) are not widely separated in frequency domain, a station's (STA) transmission on a link (e.g., link1) may negatively impact the reception ability of another STA within the MLD on another link (e.g., link2). For multi-link devices with limitations on simultaneous transmit and receive capabilities, the multi-link operation utilizes a synchronous mode operation. In synchronous mode operation, when a STA (affiliated with an MLD) is transmitting on one link (e.g., link1), another STA (affiliated with the MLD) on another link (e.g., link2) cannot receive at the same time. For example, FIG. 2 illustrates a multi-link device using synchronous mode operation to transmit data simultaneously on multiple links, such that "simultaneously" can also be "concurrently," and that "simultaneous" or "concurrent" transmission may involve being within a predetermined time interval or some margin of error and may not mean that transmission occurs at the exact same time. In examples described throughout the disclosure, "simultaneous" or "concurrent" transmission may mean transmission occurs within a predetermined time interval, such as within four microseconds. In the example of FIG. 2, the first MLD (not shown) begins by simultaneously sending a first Request to Send (RTS) frame 204-1 on link1 202-1 and a second RTS frame 204-2 on link2 202-2 to a second MLD (not shown). The first MLD then receives a first Clear to Send (CTS) frame 206-1 on link1 202-1 and a second CTS frame 206-2 on link2 202-2 from the second MLD, which initiates a simultaneous data transmission, such that a first frame 208-1 is sent on link1 202-1 and a second frame 208-2 is sent on link2 202-2. The first MLD then receives a first response frame 210-1 on link1 202-1 and a second response frame 210-2 on link2 202-2 from the second MLD. Upon receipt of the first response frame 210-1 and the second response frame 210-2, the first MLD proceeds to send a third frame 208-3 on link1 202-1 and a fourth frame 208-4 on link2 202-2 to the second MLD. In response to the third frame 208-3, the first MLD receives a third response frame 210-3 on link1 202-1, and in response to the fourth frame 208-4, the first MLD receives a fourth response frame 210-4 on link2 202-2. Examples of a response frame may include an Acknowledgement (Ack) frame or a Block Acknowledgement (BA) frame. Such an example therefore illustrates a MLD's successful transmission of data on multiple links using synchronous mode operation.

In the embodiment depicted in FIG. 2, the MLDs (not shown) communicate via multiple communication links 202-1 and 202-2. For example, two APs (identified in FIG. 2 on the left side above link1 202-1 and link2 202-2) that are affiliated with an AP MLD (not shown) communicate with two non-AP STAs (identified in FIG. 2 on the left side below link1 202-1 and link2 202-2) that are affiliated with a non-AP MLD (not shown) via corresponding communication links 202-1 or 202-2. Although the non-AP MLD in FIG. 2 is shown as including two non-AP STAs, other embodiments of the non-AP MLD may include more than two non-AP STAs. In addition, although the AP MLD and the non-AP MLD communicate (e.g., wirelessly communicates) via two links 202-1 or 202-2, in other embodiments, the AP MLD and the non-AP MLD may communicate (e.g., wirelessly communicates) via more than two communication links. In one embodiment, the AP MLD initiates synchronous frame exchange with the non-AP MLD via two or more links. In another embodiment, the non-AP MLD initiates synchronous frame exchange with the AP MLD via two or more links. Further, although the AP MLD transmits four frames 208-1, 208-2, 208-3, and 208-4 via two links 202-1 or 202-2, in other embodiments, the AP MLD may transmit fewer than four frames or more than four frames via two or more links.

When managing data transmission in multi-link devices, a conventional immediate acknowledgement procedure exists, such that after a Transmit Opportunity (TXOP) holder transmitting a Media Access Control (MAC) Protocol Data Unit (MPDU) that requires an immediate acknowledgement involves the TXOP holder waiting for an Acknowledgement (Ack) Timeout Interval. If a valid Physical Layer (PHY) header is not received during the Ack Timeout interval or a received data frame is not a valid Ack frame or BA frame addressed to the TXOP holder, the MPDU transmission is considered a failure. When a TXOP responder receives a frame that is not successfully decoded within a TXOP, the TXOP responder cannot send an Ack/BA frame at least because the TXOP responder does not know if the TXOP responder is a target receiver, if the received frame requires an immediate acknowledgement, or if the resource to be used for Ack/BA transmission of the frame is transmitted in Multi-User Physical Protocol Data Unit (MU PPDU) format.

Figure 3:
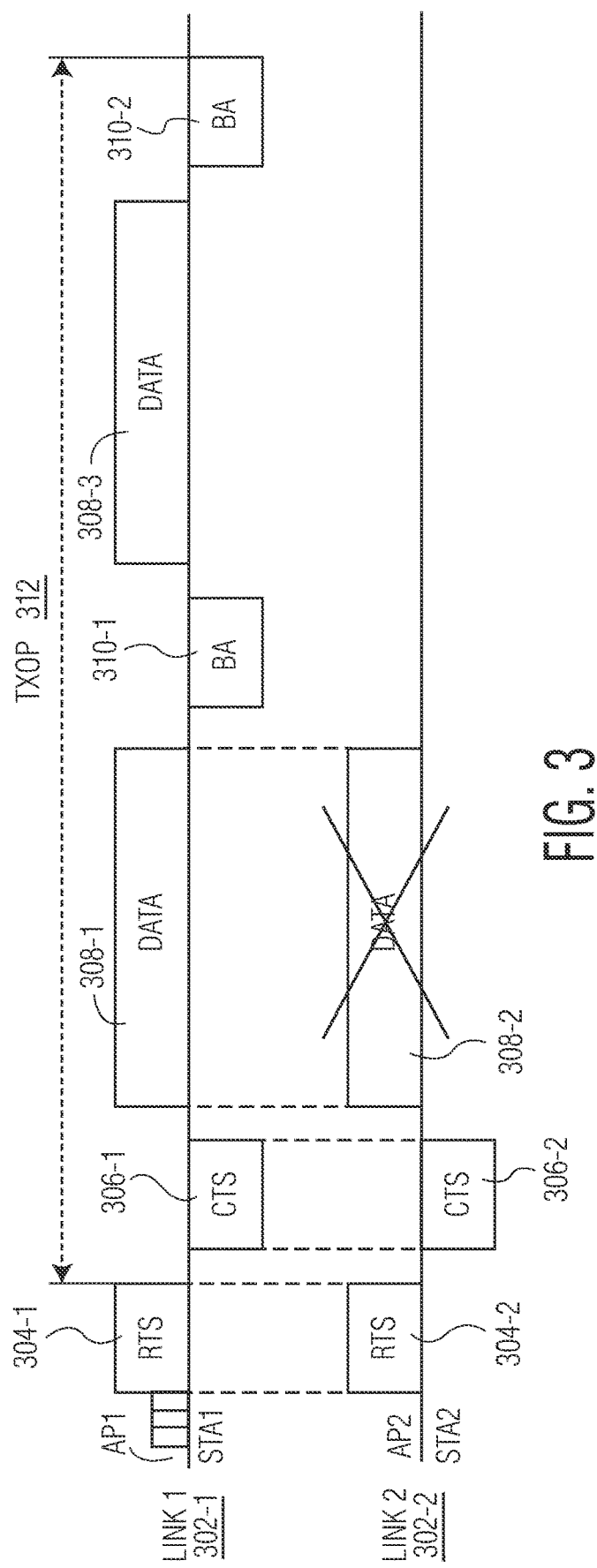
FIG. 3 illustrates another example of a technique for transmitting data that can be used in the multi-link communications system depicted in FIG. 1.

Consequently, in the conventional immediate acknowledgement procedure utilized by multi-link devices, when a MLD wants to initiate a multi-link data exchange in synchronous operation, the MLD may experience frequent errors in data transmission. For example, if a STA affiliated with a first MLD on a link (e.g., link1) acquires channel access, the first MLD sends a first Request to Send (RTS) frame to a second MLD on multiple links, setting a Transmit Opportunity (TXOP) on multiple links. Although the link 302-1 is shown in FIG. 3 as including one TXOP 312, other embodiments of the MLD may include more than one TXOP on more than one link. During the TXOP, if a second MLD does not successfully receive a frame that requests an immediate response on one link (e.g., link2) while the second MLD successfully receives another frame on another link (e.g., link1), the second MLD will not send an Ack/BA frame on link2, causing the frame on link2 to be lost. FIG. 3 illustrates an error experienced by a MLD operating in synchronous mode, such that a MLD utilizing two links, link1 302-1 and link2 302-2, attempts to initiate a multi-link data exchange in a synchronous mode operation by simultaneously transmitting data on link1 302-1 and link2 302-2. The error experienced by a MLD is further shown in FIG. 3, where multiple access points (APs), implemented as AP1 and AP2 (identified in FIG. 3 on the left side above link1 302-1 and link2 302-2) that are affiliated with a first MLD (not shown), communicate with associated STAs, which are implemented as STA1 and STA2 (identified in FIG. 3 on the left side below link1 302-1 and link2 302-2) that are affiliated with a second MLD (not shown), via multiple links, which are implemented as link1 302-1 and link2 302-2. To establish a TXOP 312 in multiple links, the first MLD simultaneously sends a first RTS frame 304-1 on link1 302-1 and a second RTS frame 304-2 on link2 302-2 to a second MLD, and receives, at the first MLD, a first Clear to Send (CTS) frame 306-1 on link1 302-1 and a second CTS frame 306-2 on link2 302-2. Upon receiving the first CTS frame 306-1 and the second CTS frame 306-2, the first MLD sends a first frame 308-1 on link1 302-1, and a second frame 308-2 on link2 302-2, such that the second MLD successfully receives the first frame 308-1 on link1 302-1 but does not successfully receive the second frame 308-2 on link2 302-2. When the second MLD successfully receives the first frame 308-1 on link1 302-1, the second MLD sends a first response frame 310-1 on link1. However, when the second MLD does not successfully receive the second frame 308-2 on link2 302-2, the second MLD will not send a response frame on link2 302-2. Examples of a response frame may include an Ack frame or a BA frame. After the second MLD sends the first response frame 310-1 on link1 302-1, the first MLD continues to send a third frame 308-3 on link1 302-1 and receives a second response frame 310-2 on link1 302-1 at the end of the TXOP 312 period. However, since the second frame 308-2 on link2 302-2 was either not successfully sent or acknowledged, the second frame 308-2 is lost.

In the example illustrated by FIG. 3, conventional medium access protocol states that the first MLD is supposed to invoke a backoff for retransmission on link2 or a PIFS recovery. However, as the first MLD is operating in synchronous mode, the first MLD may struggle to invoke a backoff during the TXOP period for a variety of reasons. One reason the first MLD may struggle to invoke a backoff is because a wireless medium assessment is put on hold when the first MLD is transmitting a frame on link1. Another reason the first MLD may struggle to invoke a backoff is because a backoff is allowed only on a single primary link, and when the primary link is link1, the first MLD may not be allowed to invoke a backoff on link2. Data transmission on link2 may therefore be even worse than a single link transmission because a backoff will begin at the end of an ongoing TXOP on a different link (e.g., link1). Further, if a backoff is allowed only on a single primary link, and the primary link is link2, even though the first MLD obtained the TXOP with proper backoff on link2, the first MLD does not initiate a retransmission process right after the MLD identifies that the data transmission failed. Further, as the first MLD is operating in synchronous mode, the first MLD may struggle to perform a PIFS recovery during the TXOP period. The first MLD may struggle to perform a PIFS recovery during the TXOP period because when the first MLD retransmits the second frame 308-2 on link2 302-2 at PIFS time after the transmission end time of the second frame 308-2, the transmission time of the retransmitted second frame 308-2 may overlap with the transmission time of the first response frame 310-1 on link1 302-1. In such an example, the transmission and the reception occurs simultaneously on link1 302-1 and on link2 302-2, which is prohibited in synchronous mode operation.

In accordance with an embodiment of the invention, a technique to implement multi-link communication involves a multi-link device (MLD) retransmitting unreceived data on another link. In such an embodiment, when a MLD indicates that the MLD does not support reception on a first link (e.g., link1) concurrent with transmission on a second link (e.g., link2), a data frame is transmitted on both link1 and link2. Therefore, even if a transmission of a data frame fails on one link, the data frame can still be delivered on another link where current TXOP is still maintained. Using this technique helps multi-link communication systems improve network efficiency and bandwidth while decreasing latency.

Figure 4:
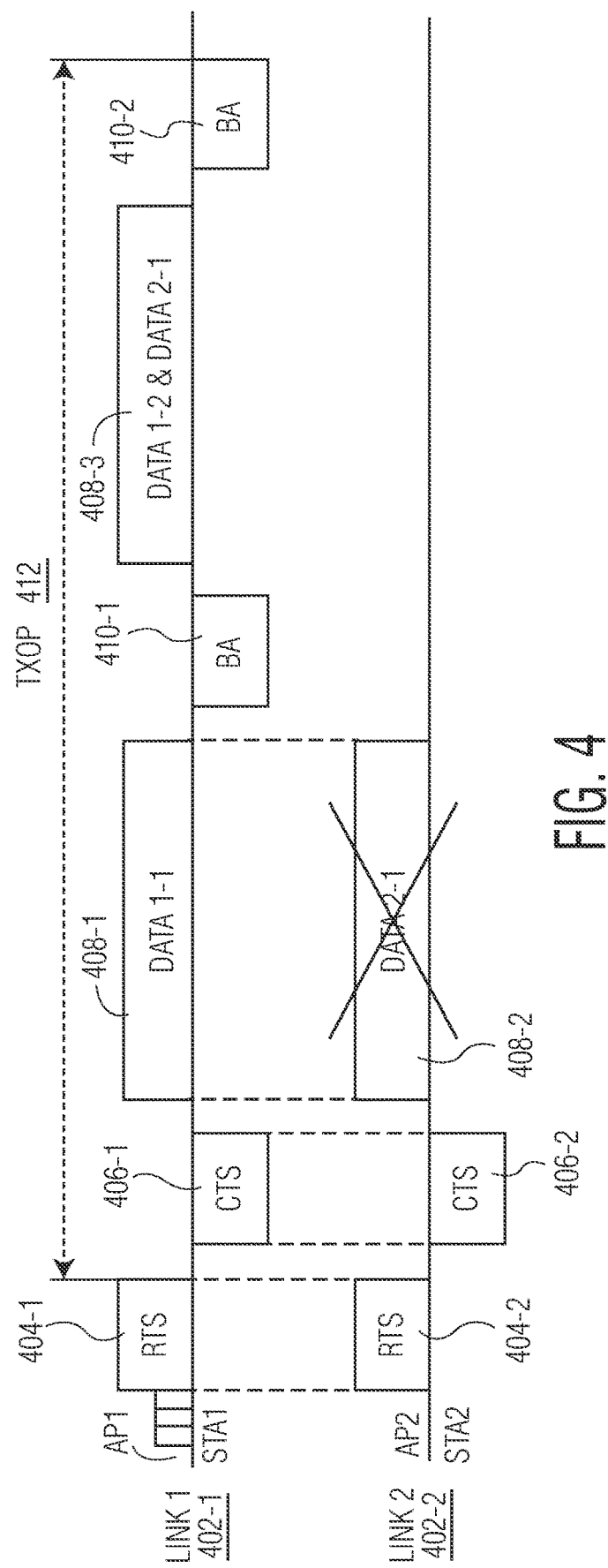
FIG. 4 illustrates another example of a technique for transmitting data that can be used in the multi-link communications system depicted in FIG. 1.

FIG. 4 illustrates a technique for retransmitting data on another link, in which a first MLD (not shown) utilizing two links, link1 402-1 and link2 402-2, simultaneously transmits data on link1 402-1 and link2 402-2 using two APs (identified in FIG. 4 on the left side above link1 402-1 and link2 402-2) to communicate with two associated STAs (identified in FIG. 4 on the left side below link1 402-1 and link2 402-2) that are affiliated with a second MLD (not shown). To establish a TXOP 412 in multiple links, the first MLD simultaneously sends a first RTS frame 404-1 on link1 402-1 and a second RTS frame 404-1 on link2 402-2 to the second MLD, and receives, at the first MLD, a first CTS frame 406-1 on link1 402-1 and a second CTS frame 406-2 on link2 402-2. Upon receiving the first CTS frame 406-1 and the second CTS frame 406-2, the first MLD sends a first frame 408-1 on link1 402-1, and a second frame 408-2 on link2 402-2, such that the second MLD successfully receives the first frame 408-1 on link1 402-1 but does not successfully receive the second frame 408-2 on link2 402-2. When the second MLD successfully receives the first frame 408-1 on link1 402-1, the second MLD sends a first response frame 410-1 on link1 402-1. However, when the second MLD does not successfully receive the second frame 408-2 on link2 402-2, the MLD will not send a response frame on link2 402-2. When the first MLD does not receive the response frame on link2 402-2, the first MLD retransmits the information carried in the second frame 408-2 in a third frame 408-3 on link1 402-1, to which the first MLD receives a second response frame 410-2 on link1 and the TXOP 412 ends. In one embodiment, the second frame 408-2 has a Traffic Identification (TID) that is mapped to both link1 402-1 and link2 402-2.

In another embodiment, when a MLD transmits the first frame with a first Traffic Identification (TID) on link1, and the second frame with a second TID on link2 simultaneously during a TXOP period, and the transmission of the first frame fails on link1, the MLD transmits the first frame on link2 while the TXOP period is still ongoing. In such an embodiment, the first TID has a priority greater than or equal to the priority of the second TID. In another embodiment, the MLD obtains the TXOP when the backoff counter on link1 is zero.

In accordance with another embodiment of the invention, a technique for multi-link communications may include, at a first multi-link device (MLD) that supports a first link, link1, and a second link, link2, transmitting a first frame during a first Transmission Opportunity (TXOP) on link1, and a second frame during a second TXOP on link2, simultaneously to a second MLD, receiving, at the first MLD, a first response frame to the first frame transmitted on link1 after a transmission end time of the first frame, identifying, at the first MLD, that a response frame to the second frame transmitted on link2 was not received after the transmission end time of the second frame, and transmitting, at the first MLD, a third frame on link1 and a fourth frame on link2 simultaneously, after receiving the first response frame on link1. Using such a technique enables multi-link communication systems to ensure error-free data transmission between multi-link devices. By accurately sending data simultaneously on at least two of the working links, multi-link communication systems may exhibit an increase in bandwidth and overall efficiency.

Figure 5:
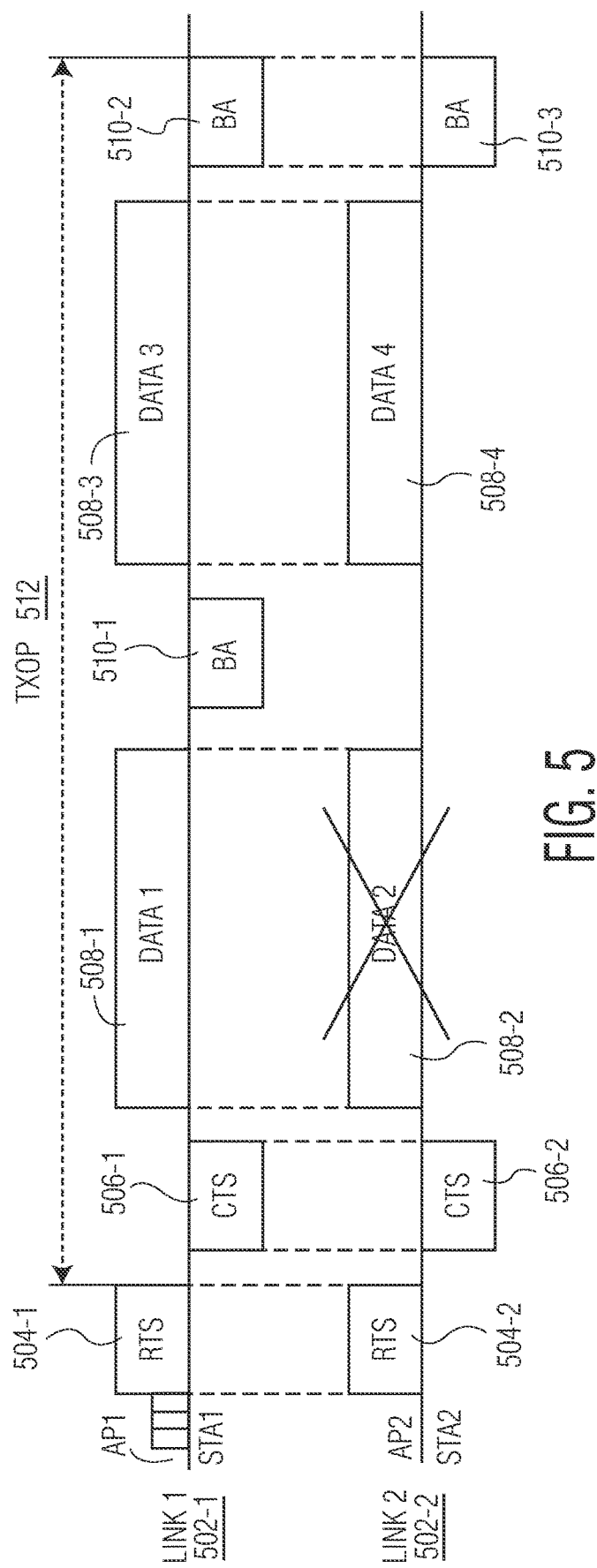
FIG. 5 illustrates another example of a technique for transmitting data that can be used in the multi-link communications system depicted in FIG. 1.

A technique for multi-link communication data transmission that involves a MLD continuing to transmit data on a failed link is described in further detail with reference to FIG. 5. FIG. 5 illustrates a technique for multi-link communications that can be used in the multi-link communications system depicted in FIG. 1 in which transmission on a link is continued when a data frame experiences an error in transmission. In such a technique, if a multi-link device (MLD) indicates that the MLD does not support reception on a first link (e.g., link1) concurrent with transmission on a second link (e.g., link2), or the MLD indicates that transmission on link1 concurrent with reception on link2 will not happen during a TXOP, and the MLD transmits a first frame on link1 and a second frame on link2, to which the MLD receives a first response frame to the first frame on link1 but does not receive a response frame to the second frame on link2, such that in one embodiment, the MLD does not receive the response frame because the reception of the response frame fails even though the response frame is transmitted. In another embodiment, the MLD does not receive the response frame because the response frame is not transmitted. Then, the MLD transmits a third frame on link1 and a fourth frame on link2 a predetermined time after the reception of the first response frame on link1 during the TXOP. Examples of a predetermined time may include SIFS or PIFS.

With reference to FIG. 5, a technique for multi-link data transmission is further illustrated, in which a first MLD (not shown) utilizing two links, link1 502-1 and link2 502-2, simultaneously transmits data on link1 502-1 and link2 502-2 using two APs (identified in FIG. 5 on the left side above link1 502-1 and link2 502-2) to communicate with two associated STAs (identified in FIG. 5 on the left side below link1 502-1 and link2 502-2) that are affiliated with a second MLD (not shown). To establish a TXOP 512 in multiple links, the first MLD simultaneously sends a first RTS frame 504-1 on link1 502-1 and a second RTS frame 504-2 on link2 502-2 to the second MLD, and receives, at the first MLD, a first CTS frame 506-1 on link1 502-1 and a second CTS frame 506-2 on link2 502-2. Upon receiving the first CTS frame 506-1 and the second CTS frame 506-2, the first MLD sends a first frame 508-1 on link1 502-1, and a second frame 508-2 on link2 502-2, such that the second MLD successfully receives the first frame 508-1 on link1

502-1 but does not successfully receive the second frame 508-2 on link2 502-2. When the second MLD successfully receives the first frame 508-1 on link1 502-1, the second MLD sends a first response frame 510-1 on link1. However, when the second MLD does not successfully receive the second frame 508-2 on link2 502-2, the second MLD will not send a response frame on link2 502-2. When the first MLD does not receive the response frame on link2 502-2, the first MLD transmits a third frame 508-3 on link1 502-1 and a fourth frame 508-4 on link2 502-2 simultaneously, after receiving the first response frame 510-1 on link1 502-1, to which the first MLD receives a second response frame 510-2 on link1 502-1 and a third response frame 510-3 on link2 502-2, ending the TXOP 512 period.

In some embodiments, the technique illustrated in FIG. 5 involves the transmission end time of the first frame 508-1 and the transmission end time of the second frame 508-2 being within a first predetermined time, such that the first predetermined time is Short Interframe Space (SIFS). Examples of the first predetermined time may include SIFS that is within some margin of error (e.g., SIFS/4=4 µs, SIFS/2=8 µs, etc.). In some embodiments, the first response frame 510-1 on link1 502-1 is received at a second predetermined time after the transmission end time of the first frame 508-1 on link1 502-1. Examples of the second predetermined time may include SIFS or PIFS that is within some margin of error (e.g., SIFS/4=4 µs, SIFS/2=8 µs, etc.). In some embodiments, after transmitting the second frame 508-2 at the first MLD, the technique further involves monitoring, at the first MLD, a wireless medium of link2 502-2 to identify link2 502-2 as an idle channel. In some embodiments, the fourth frame 508-4 is a retransmission of the second frame 508-2. The technique illustrated in FIG. 5 may further involve identifying, at the first MLD, that link2 502-2 is idle for a third predetermined time before the transmission of the fourth frame 508-4 on link2 502-2, such that the third predetermined time is Point Coordination Function (PCF) Interframe Space (PIFS). In some embodiments, even though the first MLD may support reception on link1 502-1 concurrent with transmission on link2 502-2, the first MLD will operate in synchronous mode operation if the second MLD does not support reception on link1 502-1 concurrent with transmission on link2 502-2. Alternatively, the first MLD may indicate that transmission on link1 502-1 concurrent with reception on link2 502-2 will not happen during the TXOP 512. If a MLD indicates that transmission on link1 502-1 concurrent with reception on link2 502-2 will not happen during the TXOP 512, the MLD may not invoke a new backoff unless transmission of frames on both link1 502-1 and link2 502-2 fails simultaneously during the TXOP 512.

In the example illustrated by FIG. 5, successful data transmission may rely on the following principle: as the transmission time for the first response frame for link1 502-1 and link2 502-2 are the same, as long as a responder successfully receives the first frame 508-1 on link1 502-1, the MLD can continue transmission during the TXOP 512. Even though the responder does not send a response frame on link2, a third-party STA will not transmit during the TXOP on link2 at least because if the third-party STA receives the second frame correctly, the duration information (in either a MAC header or PHY header) will prevent the third-party STA from accessing link2 during the TXOP. Alternatively, the third-party STA will not transmit during the TXOP on link2 at least because if the third-party STA fails to receive the second frame, the third-party STA has to wait at least Extended Interframe Space (EIFS) duration before the third-party STA's own transmission, such that the duration of the EIFS is longer than the duration of the second response frame.

Figure 6:
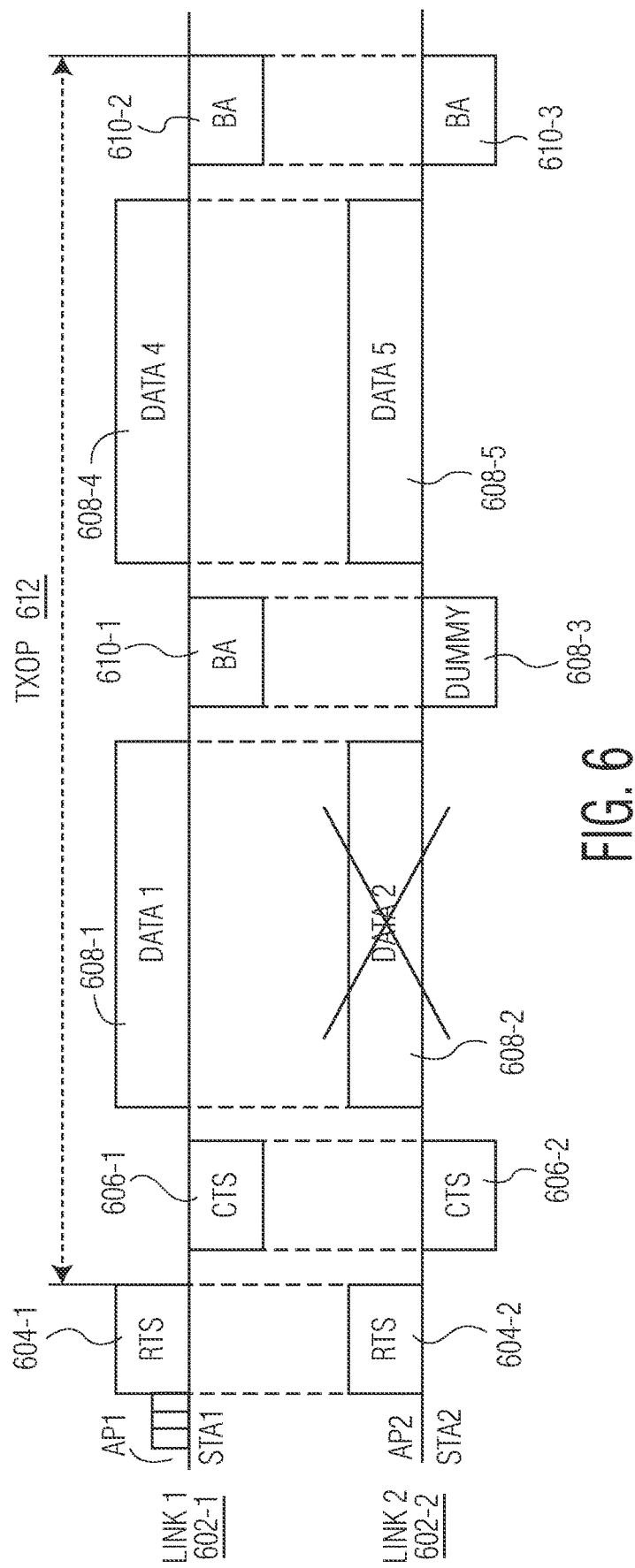
FIG. 6 illustrates another example of a technique for transmitting data that can be used in the multi-link communications system depicted in FIG. 1.

FIG. 6 illustrates another technique for multi-link communications that can be used in the multi-link communications system depicted in FIG. 1. The technique illustrated by FIG. 6 is another example of a technique that involves continued transmission on a failed link, in which a frame experiences an error in transmission and a MLD transmits a dummy frame on the failed link. In such an example, a MLD indicates that the MLD does not support reception on a first link (e.g., link1) with concurrent transmission on a second link (e.g., link2), or the MLD indicates that transmission on link1 concurrent with reception on link2 will not happen during a TXOP, and the MLD transmits a first frame on link1 and a second frame on link2 to which the MLD receives a first response frame to the first frame on link1 but the MLD receives a third frame that does not indicate successful reception of the second frame on link2. The MLD then transmits a fourth frame on link1 a predetermined time after the reception of the first response frame and a fifth frame on link2 the predetermined time after the reception of the third frame during the TXOP, such that the fourth frame and fifth frame are transmitted simultaneously.

With reference to FIG. 6, a technique for multi-link data transmission is illustrated, in which a first MLD (not shown) utilizing two links, link1 602-1 and link2 602-2, simultaneously transmits data on link1 602-1 and link2 602-2 using two APs (identified in FIG. 6 on the left side above link1 602-1 and link2 602-2) to communicate with two associated STAs (identified in FIG. 6 on the left side below link1 602-1 and link2 602-2) that are affiliated with a second MLD (not shown). To establish a TXOP 612 in multiple links, the first MLD simultaneously sends a first RTS frame 604-1 on link1 602-1 and a second RTS frame 604-2 on link2 602-2 to the second MLD, and receives, at the first MLD, a first CTS frame 606-1 on link1 602-1 and a second CTS frame 606-2 on link2 602-2. Upon receiving the first CTS frame 606-1 and the second CTS frame 606-2, the first MLD sends a first frame 608-1 on link1 602-1, and a second frame 608-2 on link2 602-2, such that the second MLD successfully receives the first frame 608-1 on link1 602-1 but does not successfully receive the second frame 608-2 on link2 602-2. When the second MLD successfully receives the first frame 608-1 on link1 602-1, the second MLD sends a first response frame 610-1 (e.g., Ack/BA frame) on link1 602-1. However, when the second MLD does not successfully receive the second frame 608-2 on link2 602-2, the second MLD sends a third frame 608-3 (e.g., a dummy frame) on link2 602-2. When the first MLD does not receive a response frame on link2 602-2, the first MLD transmits a fourth frame 608-4 on link1 602-1 and a fifth frame 608-5 on link2 602-2 simultaneously after receiving the first response frame 610-1 on link1 602-1 and the third frame 608-3 on link2 602-2, to which the first MLD receives a second response frame 610-2 on link1 602-1 and a third response frame 610-3 on link2 602-2, ending the TXOP 612 period.

In such a technique as illustrated in FIG. 6, as the transmission time for the response frame for both links are the same, even though a responder fails to receive the second frame, the responder can identify the time reserved for the response frame. Therefore, the responder transmits a third frame that is not an Ack/BA frame to the second frame to maintain a wireless medium during the transmission period. In some embodiments, the third frame is a dummy frame (e.g., a QoS, null frame, NDP frame, etc.). In some embodiments, the third frame indicates that the reception is failed (e.g., the information that the reception is failed is indicated in a Control Field of the third frame). In some embodiments, the third frame is an Aggregated MAC Protocol Data Unit (A-MPDU) or Single MAC Protocol Data Unit (S-MPDU), such that the A-MPDU or S-MPDU does not include A-MPDU pre-Ethernet Over Fiber (EOF) padding fields. In another embodiment, the technique illustrated by FIG. 6 further involves the MLD monitoring the wireless medium on link2 602-2 after receiving the third frame 608-3, and the MLD further identifying that the channel is idle for a predetermined time, such that the predetermined time may be SIFS or PIFS. In another embodiment, the fifth frame 608-5 transmitted on link2 602-2 is a retransmission of the second frame 608-2. In another embodiment, the MLD indicates that the MLD supports transmission on the first link (e.g., link1) concurrent with reception on the second link (e.g., link2) and the responder indicates that the responder does not support transmission on link1 concurrent with reception on link2.

Figure 7:
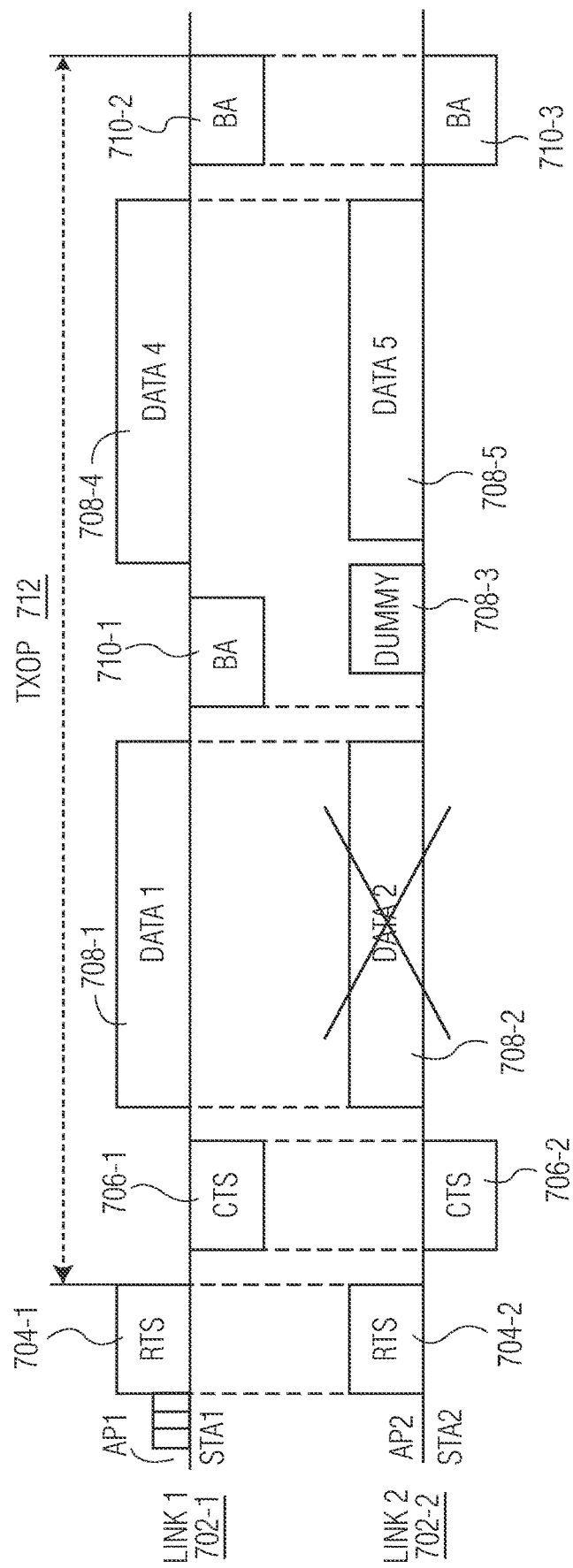
FIG. 7 illustrates another example of a technique for transmitting data that can be used in the multi-link communications system depicted in FIG. 1.

FIG. 7 illustrates another technique for multi-link communications that can be used in the multi-link communications system depicted in FIG. 1. The technique illustrated in FIG. 7 is another example of a technique that involves continued transmission on a failed link, in which a data frame experiences an error in transmission and a multi-link device transmits a dummy frame on the failed link. In the example of FIG. 7, a MLD indicates that the MLD does not support reception on a first link (e.g., link1) with transmission on a second link (e.g., link2), or the MLD indicates that transmission on link1 concurrent with reception on link2 will not happen during a TXOP. The MLD then transmits a first frame on link1 and a second frame on link2, to which the MLD receives a first response frame to the first frame on link1 but does not receive a response frame to the second frame on link2, indicating the second frame was not successfully transmitted. In response to the reception of the first response frame on link1, the MLD transmits a fourth frame on link1. In response to not receiving the response frame on link2, the MLD transmits a third frame on link2 a predetermined time after the transmission end time of the second frame, in which the transmission power of the third frame may be less than the transmission power of the second frame. Examples of a predetermined time may include SIFS or PIFS. In response to the transmission of the third frame, the MLD transmits a fifth frame on link2.

With reference to FIG. 7, a technique for multi-link data transmission is further illustrated, in which a first MLD (not shown) utilizing two links, link1 702-1 and link2 702-2, simultaneously transmits data on link1 702-1 and link2 702-2 using two APs (identified in FIG. 7 on the left side above link1 702-1 and link2 702-2) to communicate with two associated STAs (identified in FIG. 2 on the left side below link1 702-1 and link2 702-2) affiliated with a second MLD (not shown). To establish a TXOP 712 in multiple links, the first MLD simultaneously sends a first RTS frame 704-1 on link1 702-1 and a second RTS frame 704-2 on link2 702-2 to the second MLD, and receives, at the first MLD, a first CTS frame 706-1 on link1 702-1 and a second CTS frame 706-2 on link2 702-2. Upon receiving the first CTS frame 706-1 and the second CTS frame 706-2, the first MLD sends a first frame 708-1 on link1 702-1, and a second frame 708-2 on link2 702-2, to which the second MLD successfully receives the first frame 708-1 on link1 702-1 but does not successfully receive the second frame 708-2 on link2 702-2. When the second MLD successfully receives the first frame 708-1 on link1 702-1, the second MLD sends a first response frame 710-1 on link1. However, when the second MLD does not successfully receive the second frame 708-2 on link2 702-2, the second MLD does not send back any response frame. Upon identifying that no response frame was received on link2 702-2, the first MLD sends a third frame 708-3 on link2 702-2 a predetermined time after the transmission end time of the second frame 708-2 to maintain a wireless medium. Upon receiving the first response frame 710-1 on link1 702-1, the first MLD sends a fourth frame 708-4 on link1 702-1, to which the first MLD receives a second response frame 710-2 on link1. After sending the third frame 708-3 on link2 702-2, the first MLD sends a fifth frame 708-5 on link2 702-2, to which the first MLD receives a third response frame 710-3 on link2 702-2, ending the TXOP 712 period.

In such a technique as illustrated in FIG. 7, some embodiments further involve the third frame 708-3 transmitted by the first MLD being a dummy frame (e.g., a QoS, null frame, NDP frame, etc.), in which the transmission power of the third frame may be reduced such that the interference from the transmission of the third frame on link2 702-2 to the reception of the first response frame 710-1 on link1 702-1 is less than a predetermined level. In one example, the transmission power may be the minimum transmission power that is available for the MLD. In some embodiments, the predetermined time of the technique illustrated by FIG. 7 is PIFS. In another embodiment, the time difference between the transmission end time of the third frame and the reception end time of the first response frame is within a predetermined duration, such that the predetermined duration is SIFS or zero. In some embodiments, the MLD transmits the fourth frame 708-4 on link1 702-1 a predetermined time after the reception end time of the first response frame and also transmits the fifth frame 708-5 on link2 702-2 the predetermined time after the transmission end time of the third frame 708-3, such that the time difference between the transmission end time of the fourth frame 708-4 and the fifth frame 708-5 is within the predetermined duration.

In some embodiments, a multi-link communication may include a MLD that can transmit on one link and receive on another link simultaneously (e.g., a Simultaneous Transmit/Receive (STR) MLD), or a MLD that cannot transmit on one link and receive on another link simultaneously (e.g., non-STR MLD). When a first multi-link device (MLD) transmits frames to a non-STR MLD on multiple links, the MLD implies that the non-STR MLD cannot transmit on one link and receive on another link within the multiple links. For example, if a second MLD supports link1, link2, and link3, and non-STR capability applies only between link1 and link2, and the second MLD is a STR MLD between either link1 and link3 or link2 and link3, the example described herein applies to the case that the first MLD transmits frames to the second MLD on link1 and link2. Such an example illustrates that when a first MLD transmits frames to a second non-STR MLD on multiple links soliciting immediate responses, the expectations are that ending times of PPDUs simultaneously sent on multiple links are aligned, and the duration of the immediate response on the multiple links is the same or the difference of the duration on different links is within a predetermined value. However, when the first MLD transmits frames to the second non-STR MLD on multiple links such that an immediate response is not solicited on a first set of links within the multiple links, and an immediate response is solicited on a second set of links within the multiple links, as the second MLD is a non-STR MLD, the second MLD may not receive frames on the first set of links successfully due to interference from the second non-STR MLD's transmission on the second set of links.

Unfortunately, experiencing interference when transmitting frames across multiple links between multi-link devices can reduce network efficiency and bandwidth availability.

To enable error-free transmission of data to non-STR MLDs, there are several different example approaches described and illustrated herein. In one embodiment, when a first MLD transmits frames on multiple links to a non-STR MLD simultaneously on multiple links, the Ack Policy of frames on the multiple links is the same for all links. In another embodiment, when a first MLD transmits frames on multiple links to a non-STR MLD simultaneously on multiple links, and when an Ack Policy Indicator subfield of frames on one link within the multiple links is set to Normal Ack or Implicit Block Acknowledgement Request (BAR), the Ack Policy Indicator subfield of frames on one or more other links within the multiple links is set to Normal Ack or Implicit BAR. In another embodiment, when a first MLD transmits frames on multiple links to a non-STR MLD simultaneously on multiple links, and when a frame transmitted on one link solicits an immediate response, one or more frames transmitted on one or more other links simultaneously solicits an immediate response. In another embodiment, when a first MLD intends to align ending times of PPDUs transmitted simultaneously on multiple links to a non-STR MLD, the Ack Policy of frames carried by the PPDUs is the same. In another embodiment, when a first MLD transmits frames on multiple links to a non-STR MLD simultaneously on multiple links, the Ack Policy of frames on the multiple links is the same unless the transmitted frame is the last frame within a TXOP. Thus, the aforementioned approaches enable multi-link communication systems to establish a link monitoring policy that puts MLDs in a position to experience less errors in data frame transmission.

In an example where an MLD wants to initiate a multi-link data exchange in synchronous mode and an STA affiliated with the MLD on one link (e.g., link1) acquires channel access, the MLD sends a first Request to Send (RTS) frame to a second MLD on multiple links, which sets a TXOP in multiple links. During the TXOP, when a second MLD does not successfully receive a frame that requests an immediate response on one link (e.g., link2) while the second MLD successfully received another frame on link1, the second MLD will not send an Ack/BA frame on link2. Based on conventional medium access protocol in such an example, an MLD is supposed to invoke another backoff for retransmission on link2. However, as the MLD is operating in synchronous mode, backoff is difficult to invoke in the MLD during the TXOP period of link1. Backoff is difficult to invoke because wireless medium assessment will be on hold when the MLD is transmitting a frame on link1, or if backoff is allowed only on a single primary link (e.g., link1), and the primary link is link1, the MLD may not be allowed to invoke a backoff on link2. Furthermore, data delivery on link2 is even worse than a single link transmission case because backoff will begin at the end of an ongoing TXOP on a different link (e.g., link1), or in the case a backoff is allowed only on a single primary link (e.g., link2), and the primary link is link2, even though the MLD obtained the TXOP with proper backoff on link2, the MLD cannot initiate a retransmission process right after the MLD identifies that the data transmission failed.

To overcome the limitations set forth by the previous example, several solutions are described herein. In one embodiment, when a STR MLD obtains TXOPs on multiple links and transmits frames to a non-STR MLD soliciting immediate response on the multiple links, and if the STR MLD does not receive an immediate response successfully on a link (e.g., link1), and if the STR MLD receives an immediate response successfully on at least one other link (e.g., link2), then at least one continued frame transmission processes occurs, such that either (i) a frame reception (e.g., BA/Ack frame) is not detected during a first time period after the transmission of the frame on the link, and the STR MLD continues transmission on the link a first predetermined time after the expected end time of the immediate response if channel is idle, or (ii) a frame reception is detected during the first time period but the valid immediate response (e.g., BA/Ack frame) was not successfully received, and the STR MLD continues transmission on the link a second predetermined time after the end time of the frame reception if channel is idle. In another embodiment, when a non-STR MLD obtains TXOPs on multiple links and transmits frames to a STR MLD soliciting immediate response on the multiple links, and if the non-STR MLD does not receive an immediate response successfully on a link (e.g., link1), and if the non-STR MLD receives an immediate response successfully on at least one other link (e.g., link2), then at least one continued frame transmission processes occurs, such that either (i) a frame reception (e.g., BA/Ack frame) is not detected during a first time period after the transmission of the frame on the link, and the non-STR MLD continues transmission on the link a first predetermined time after the expected end time of the immediate response if channel is idle, or (ii) a frame reception is detected during the first time period but the valid immediate response (e.g., BA/Ack frame) was not successfully received, and the non-STR MLD continues transmission on the link a second predetermined time after the end time of the frame reception if channel is idle.

In further embodiments, when an AP MLD obtains TXOPs on multiple links and transmits frames to a non-STR MLD soliciting immediate response on the multiple links and intends to align the ending time of down link (DL) PPDUs during the obtained TXOPs, and if the MLD does not receive an immediate response successfully on a link (e.g., link1) and the MLD receives an immediate response successfully on at least one other link (e.g., link2), at least one frame transmission occurs, such that either (i) a PHY-RXSTART.indication primitive does not occur during the Acknowledgement Timeout (AckTimeout) interval, and the AP MLD continues its frame transmission on the link SIFS time after the expected end time of the immediate response frame if a channel is idle for PIFS (or SIFS) prior to the start of the frame transmission, provided that the duration of the frame exchange is less than the remaining Transmission Network Allocation Vector (TXNAV) timer value, or (ii) the PHY-RXSTART.indication primitive does occur during the AckTimeout interval but the AP MLD does not recognize a valid acknowledgement frame addressed to the AP MLD on the link on PHY-RXEND.indication primitive, and the AP MLD continues its transmission on the link if channel is idle at the TxPIFS slot boundary, provided that the duration of the frame exchange is less than the remaining TXNAV timer value. Such an embodiment further involves the first time period being an AckTimeout interval, such that the AckTimeout interval may be defined as a conventional AckTimeout interval defined in the IEEE 802.11 standard or a modified version of the conventional AckTimeout interval to accommodate IEEE 802.11 TGbe features. In another embodiment, the first time period is a value of "aSIFSTime+aSlotTime+aRxPHYStartDelay" as defined in the IEEE 802.11 standard. In another embodiment, frame reception is detected during the first time period if a PHY-RXSTART.indication primitive occurs during the first time period, or if the frame reception is detected during the first time period, the first MLD waits for a corresponding PHY-RXEND.indication primitive to determine whether the frame transmission was successfully received, such that if the first MLD recognizes a valid Ack frame addressed to the first MLD and corresponding to the PHY-RXEND.indication primitive, the recognition is interpreted as a successful Ack. In some embodiments, continuation of the frame exchange is allowed if the duration of the frame exchange is less than remaining TXNAV timer value. In some embodiments, the first predetermined time is SIFS and the second predetermined time is PIFS. Such an embodiment may be applied for the case that the first MLD intends to align the ending time of PPDUs during the obtained TXOPs. In some embodiments, to check if a channel is idle, the first MLD checks for TxPIFS slot boundary or TxSIFS slot boundary before its transmission. Such an embodiment may be applied for the frame exchange after a valid response to initial frames of TXOPs on multiple links that are received by the first MLD, such that the first MLD continues frame exchange while the first MLD transmits on one or more link simultaneously, and the start time of the continued frame transmission happens when the first MLD transmits on the one or more links.

In accordance with another embodiment of the invention, a technique for multi-link communications may include, at a first multi-link device (MLD) that supports a first link, link1, and a second link, link2, transmitting a first frame during a first Transmission Opportunity (TXOP) on link1, and a second frame during a second TXOP on link2, wherein a transmission end time of Physical Protocol Data Units (PPDUs) carrying the first frame and the second frame is aligned within a first predetermined time, and wherein the first frame solicits a first immediate response frame and the second frame solicits a second immediate response frame, receiving, at the first MLD, the first immediate response frame on link1, identifying, at the first MLD, that an immediate response frame to the second frame transmitted on link2 was not received, after the transmission end time of the second frame, transmitting, at the first MLD, a third frame on link1 at a second predetermined time after receiving the first immediate response frame, and transmitting, at the first MLD, a fourth frame on link2 when the first MLD identifies that link2 is idle. Using such a technique enables multi-link communication systems to achieve error-free transmission of data between multi-link devices. By simultaneously sending data on at least two of the working links, multi-link communication systems may exhibit an increase in bandwidth and overall efficiency.

A technique for multi-link communication data transmission that involves a MLD continuing to transmit data on a failed link is described in further detail below with reference to FIGS. 8, 9, and 10.

Figure 8:
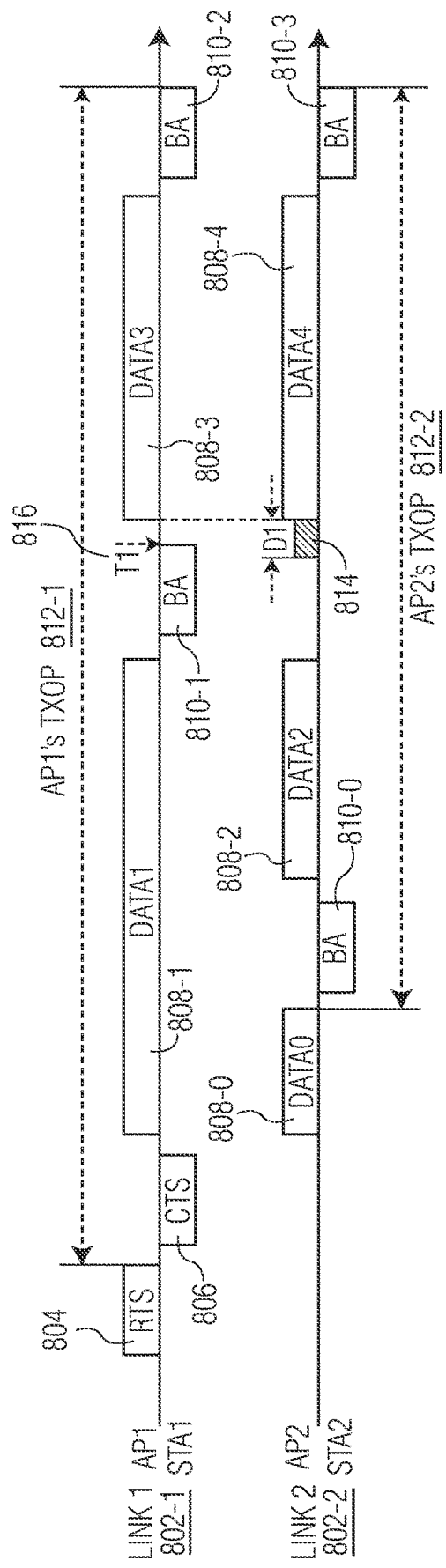
FIG. 8 illustrates another example of a technique for transmitting data that can be used in the multi-link communications system depicted in FIG. 1.

FIG. 8 illustrates a technique for multi-link communications that can be used in the multi-link communications system depicted in FIG. 1. The technique illustrated in FIG. 8 is one example of a process that involves continued transmission on a link where a data frame experiences an error in transmission. In the example, an AP MLD (not shown) obtains a TXOP on multiple links (e.g., link1 and link2) to communicate with a non-AP MLD (not shown), such that the AP MLD is a STR MLD and the non-AP MLD is a non-STR MLD. For data transmission on link1 after a valid initial frame exchange, a first MLD (not shown) successfully receives an immediate response to a frame. However, after a valid initial frame exchange on link2, a second frame that solicits an immediate response frame is transmitted on link2, to which the first MLD does not successfully receive an immediate response frame. In such an example, a third frame and a fourth frame are then transmitted simultaneously to align with the respective TXOPs of each link and receive immediate response frames. In some embodiments, the fourth frame may be a retransmission of the second frame.

With reference to FIG. 8, such a technique is further illustrated as the example features an AP MLD (not shown) that includes two APs (identified in FIG. 8 on the left side above link1 802-1 and link2 802-2), such that the AP MLD is a STR MLD and obtains AP1's TXOP 812-1 on link1 802-1 and AP2's TXOP 812-2 on link2 802-2. In addition, the example features a non-AP MLD (not shown), such that the non-AP MLD is a non-STR MLD that includes two STAs (identified in FIG. 8 on the left side below link1 802-1 and link2 802-2). In such an example, a Request to Send (RTS) frame 804 is sent on link1 802-1 to which the AP MLD receives a Clear to Send (CTS) frame 806 and begins AP1's TXOP 812-1 on link1 802-1. Then, a first frame 808-1 is transmitted on link1 802-1 and a zero frame 808-0 is transmitted on link2 802-2, such that the AP MLD receives an initial response frame 810-0 in response to the zero frame 808-0 on link2 802-2 which begins AP2's TXOP 812-2 on link2 802-2. Examples of an initial response frame may include an Ack/BA frame. After receiving the initial response frame 810-0 on link2 802-2, a second frame 808-2 is transmitted within a first predetermined time that aligns with the PPDU end time of the first frame 808-1 on link1 802-1, such that the first predetermined time is equal to or less than Short Interframe Space (SIFS). Although the first frame 808-1 on link1 802-1 and the second frame 808-2 on link2 802-2 both solicit an immediate response frame, the AP MLD only receives a first immediate response frame 810-1 to the first frame 808-1 on link1 802-1, while the AP MLD does not receive an immediate response frame to the second frame 808-2 on link2 802-2. Examples of an immediate response frame may include an Ack/BA frame. In such an example, PHY-RXSTART.indication primitive does not occur during the AckTimeout interval. Then, SIFS time after the expected end time (shown as T1 816) of the first immediate response frame 810-1, AP2 continues to transmit a fourth frame 808-4 on link2 if the channel is idle during D1 time 814 before the transmission of the fourth frame 808-4. In some embodiments, D1 time 814 may be SIFS or PIFS. Furthermore, in such an example, AP1 transmits a third frame 808-3 on link1 802-1 that is transmitted simultaneously with the fourth frame 808-4 transmitted on link2 802-2. The AP MLD then receives a second immediate response frame 810-2 on link1 802-1 and a third immediate response frame 810-3 on link2 802-2 to the third frame 808-3 on link1 802-1 and the fourth frame 808-4 on link2 802-2 that end with AP1's TXOP 812-1 on link1 802-1 and AP2's TXOP 812-2 on link2 802-2, respectively.

Figure 9:
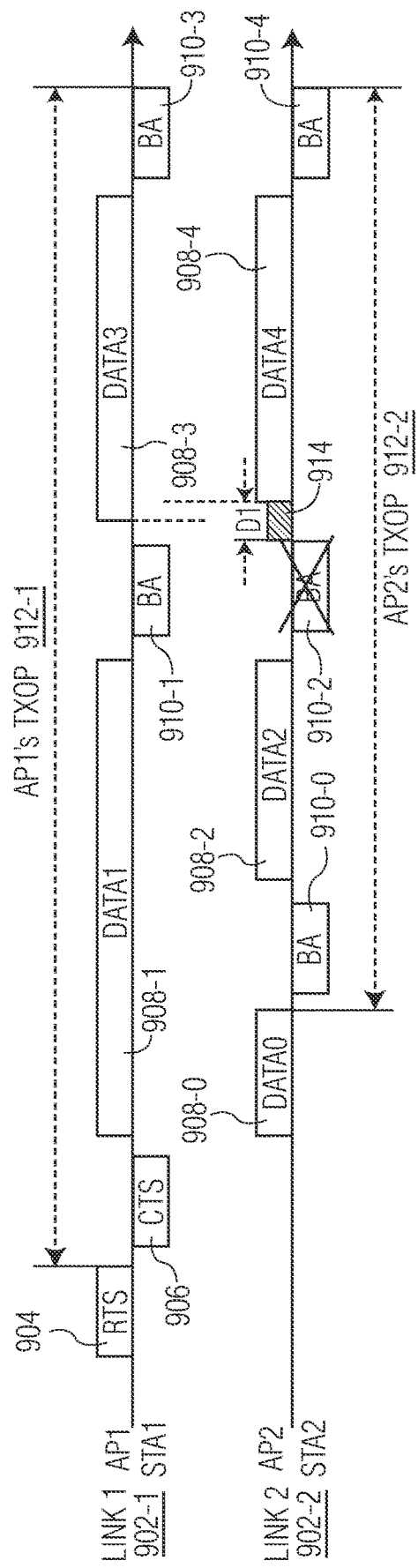
FIG. 9 illustrates another example of a technique for transmitting data that can be used in the multi-link communications system depicted in FIG. 1.

FIG. 9 illustrates a technique for multi-link communications that can be used in the multi-link communications system depicted in FIG. 1. The technique illustrated in FIG. 9 is one example of a process that involves continued transmission on a link where a data frame experiences a decoding failure. In such an example, an AP MLD (not shown) obtains a TXOP on multiple links (e.g., link1 and link2) to communicate with a non-AP MLD (not shown), such that the AP MLD is a STR MLD and the non-AP MLD is a non-STR MLD. For data transmission on link1 after a valid initial frame exchange, a first MLD (not shown) successfully receives an immediate response to a frame. However, after a valid initial frame exchange on link2, a second frame that solicits an immediate response frame is transmitted on link2, to which the first MLD does not successfully receive an immediate response frame. In such an example, a third frame and a fourth frame are then transmitted at different PPDU start times but have the same PPDU end time and receive immediate response frames to align with the respective TXOPs of each link.

With reference to FIG. 9, such a technique is further illustrated as the example features an AP MLD (not shown) that includes two APs (identified in FIG. 9 on the left side above link1 902-1 and link2 902-2), such that the AP MLD is a STR MLD and obtains AP1's TXOP 912-1 on link1 902-1 and AP2's TXOP 912-2 on link2 902-2. In addition, the example features a non-AP MLD (not shown), in which the non-AP MLD is a non-STR MLD that includes two STAs (identified in FIG. 9 on the left side below link1 902-1 and link2 902-2). In such an example, a Request to Send (RTS) frame 904 is sent on link1 902-1 to which the AP MLD receives a Clear to Send (CTS) frame 906 and begins AP1's TXOP 912-1 on link1 902-1. Then, a first frame 908-1 is transmitted on link1 902-1 and a zero frame 908-0 is transmitted on link2 902-2, to which the AP MLD receives an initial response frame 910-0 to the zero frame 908-0 on link2 902-2 which begins AP2's TXOP 912-2 on link2 902-2. Examples of an initial response frame may include an Ack/BA frame. After receiving the initial response frame 910-0 on link2 902-2, a second frame 908-2 is transmitted that aligns with the PPDU end time of the first frame 908-1 on link1 902-1. Although the first frame 908-1 on link1 902-1 and the second frame 908-2 on link2 902-2 both solicit an immediate response frame, the AP MLD only successfully receives a first immediate response frame 910-1 on link1 902-1 in response to the first frame 908-1 on link1 902-1, whereas the AP MLD does not successfully receive a second immediate response frame 910-2 in response to the second frame 908-2 on link2 902-2. Examples of an immediate response frame may include an Ack/BA frame. In the example, PHY-RXSTART.indication primitive of the second immediate response frame 910-2 occurs during the AckTimeout interval but decoding of the second immediate response frame 910-2 fails. In the example, a valid Ack frame addressed to AP1 is not recognized corresponding to the PHY-RXEND.indication primitive of the second immediate response frame 910-2 on link2 902-2. AP2 then continues transmission of a fourth frame 908-4 on link2 902-2 after the Carrier Sense (CS) mechanism indicates that link2's channel medium is idle at the TxPIFS slot boundary (shown by D1 914). Further, in such an example, AP1 transmits a third frame 908-3 on link1 902-1, such that the third frame 908-3 is transmitted at a PPDU start time that is not aligned with the PPDU start time of the fourth frame 908-4 transmitted on link2 902-2. The AP MLD then receives a third immediate response frame 910-3 on link1 902-1 and a fourth immediate response frame 910-4 on link2 902-2 in response to the third frame 908-3 on link1 902-1 and the fourth frame 908-4 on link2 902-2 that end with AP1's TXOP 912-1 on link1 902-1 and AP2's TXOP 912-2 on link2 902-2, respectively.

Figure 10:
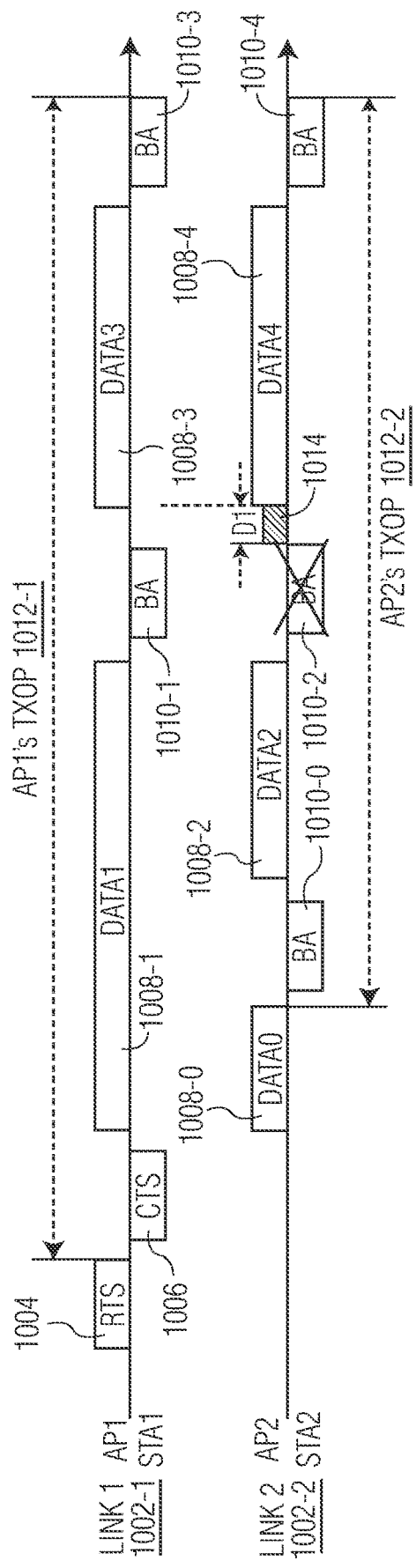
FIG. 10 illustrates another example of a technique for transmitting data that can be used in the multi-link communications system depicted in FIG. 1.

FIG. 10 illustrates a technique for multi-link communications that can be used in the multi-link communications system depicted in FIG. 1. The technique illustrated in FIG. 10 is one example of a process that involves continued transmission on a link where a data frame experiences a decoding failure. In such an example, an AP MLD (not shown) obtains a TXOP on multiple links (e.g., link1 and link2) to communicate with a non-AP MLD (not shown), such that the AP MLD is a STR MLD and the non-AP MLD is a non-STR MLD. For data transmission on link1 after a valid initial frame exchange, a first MLD (not shown) successfully receives an immediate response to a frame. However, after a valid initial frame exchange on link2, a second frame that solicits an immediate response frame is transmitted on link2, to which the first MLD does not successfully receive an immediate response frame. In such an example, a third frame and a fourth frame are simultaneously transmitted with the same PPDU start/end times and receive immediate response frames to align with the respective TXOPs of each link.

With reference to FIG. 10, such a technique is further illustrated as the example features an AP MLD (not shown) that includes two APs (identified in FIG. 10 on the left side above link1 1002-1 and link2 1002-2), such that the AP MLD is a STR MLD and obtains AP1's TXOP 1012-1 on link1 1002-1 and AP2's TXOP 1012-2 on link2 1002-2. In addition, the example features a non-AP MLD (not shown), such that the non-AP MLD is a non-STR MLD that includes two STAs (identified in FIG. 10 on the left side below link1 1002-1 and link2 1002-2). In such an example, a Request to Send (RTS) frame 1004 is sent on link1 1002-1 to which the AP MLD receives a Clear to Send (CTS) frame 1006 and begins AP1's TXOP 1012-1 on link1 1002-1. Then, a first frame 1008-1 is transmitted on link1 1002-1 and a zero frame 1008-0 is transmitted on link2 1002-2, such that the AP MLD receives an initial response frame 1010-0 to the zero frame 1008-0 on link2 1002-2 which begins AP2's TXOP 1012-2 on link2 1002-2. Examples of an initial response frame include an Ack/BA frame. After receiving the initial response frame 1010-0 on link2 1002-2, a second frame 1008-2 is transmitted that aligns with the PPDU end time of the first frame 1008-1 on link1 1002-1. Although the first frame 1008-1 on link1 1002-1 and the second frame 1008-2 on link2 1002-2 both solicit an immediate response frame, the AP MLD only successfully receives a first immediate response frame 1010-1 on link1 1002-1 to the first frame 1008-1 on link1 1002-1, whereas the AP MLD is sent a second immediate response frame 1010-2 in response to the second frame 1008-2 on link2 1002-2 but does not successfully receive the second immediate response frame 1010-2. Examples of an immediate response frame may include an Ack/BA frame. In such an example, PHY-RXSTART.indication primitive of the second immediate response frame 1010-2 occurs during the AckTimeout interval but decoding of the second immediate response frame 1010-2 fails. In such an example, a valid Ack frame addressed to AP1 is not recognized corresponding to the PHY-RXEND.indication primitive of the second immediate response frame 1010-2 on link2 1002-2. AP2 then continues transmission of a fourth frame 1008-4 on link2 1002-2 after the Carrier Sense (CS) mechanism indicates that link2's channel medium is idle at the TxPIFS slot boundary (shown by D1 1014). Further, in such an example, AP1 continues transmission on link1 1002-1 by transmitting a third frame 1008-3, such that the third frame 1008-3 is transmitted PIFS time (shown by D1 1014) after the reception of the first immediate response frame 1010-1. Thus, the PPDU start/end time of the third frame 1008-3 on link1 1002-1 and the fourth frame 1008-4 on link2 1002-2 are aligned. The AP MLD then receives a third immediate response frame 1010-3 on link1 1002-1 and a fourth immediate response frame 1010-4 on link2 1002-2 in response to the third frame 1008-3 on link1 1002-1 and the fourth frame 1008-4 on link2 1002-2 that ends AP1's TXOP 1012-1 on link1 1002-1 and AP2's TXOP 1012-2 on link2 1002-2, respectively.

Figure 11:
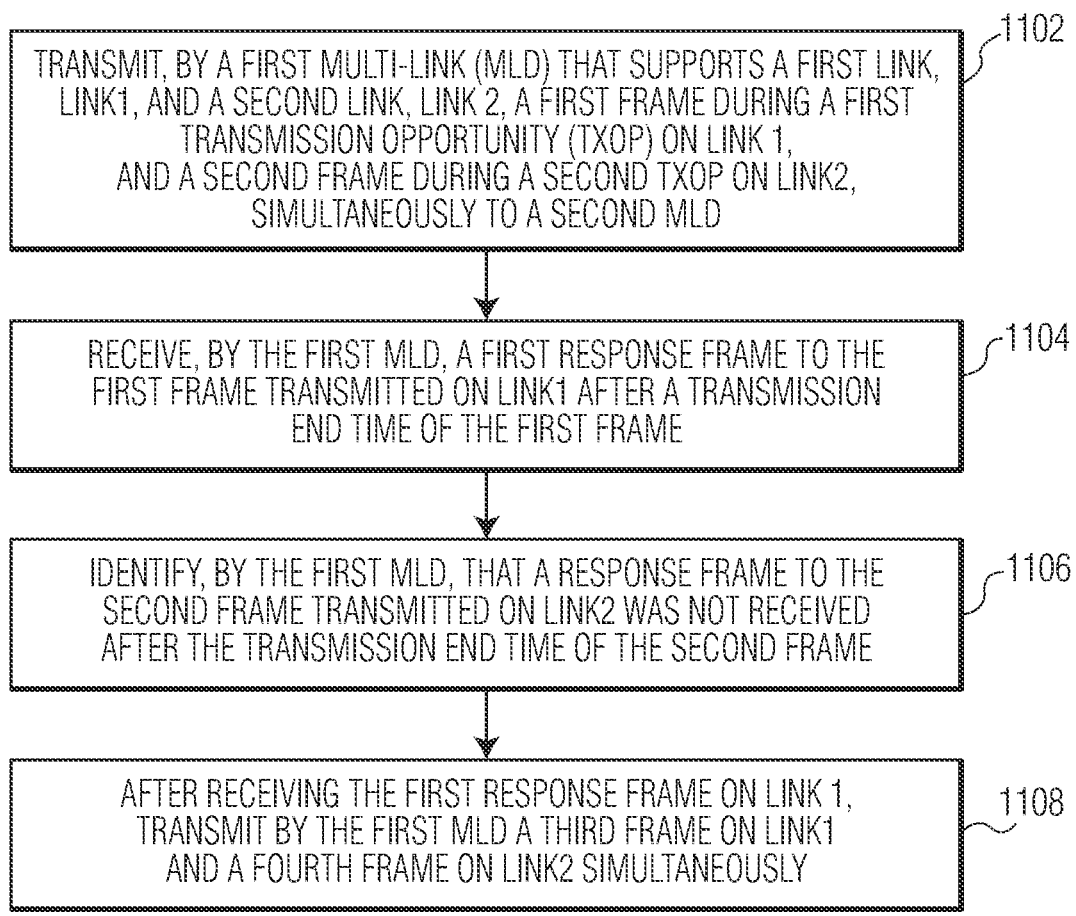
FIG. 11 illustrates a flow diagram of a technique for transmitting data that can be used in the multi-link communications system depicted in FIG. 1.

A technique for transmitting data that can be used in a multi-link communications system depicted in FIG. 1 is described with reference to a flow diagram of FIG. 11. At block 1102 a first multi-link device (MLD) that supports a first link, link1, and a second link, link2, transmits a first frame during a first Transmission Opportunity (TXOP) on link1, and a second frame during a second TXOP on link2, simultaneously to a second MLD. As an example, the first MLD may be AP MLD 104 and the link may be link 102-1 in the multi-link communications system 100. At block 1104, a first response frame to the first frame transmitted on link1 after a transmission end time of the first frame is received by the first MLD. At block 1106, an identification that a response frame to the second frame transmitted on link2 was not received after the transmission end time of the second frame is made by the first MLD. At block 1108, a third frame on link1 and a fourth frame on link2 are transmitted simultaneously by the first MLD after receiving the first frame on link1.

In some embodiments, a technique for multi-link communications between a non-STR MLD and an STR MLD may further involve continued transmission on a link where a response frame experiences a transmission error. For example, the non-STR MLD may transmit a first frame on link1 and a second frame on link2 to the STR MLD, such that an end transmission time of the first frame on link1 and the second frame on link2 are aligned (e.g., within a predetermined margin). In such an example, the STR MLD sends a first response frame on link1 in response to receiving the first frame on link1, in which the first response frame is successfully received at the non-STR MLD on link1. Although the STR MLD also sends a response frame on link2 in response to receiving the second frame on link2, the response frame is not successfully received at the non-STR MLD on link2. When the non-STR MLD does not successfully receive the response frame on link2, this may be due to a PHY-RXSTART.indication being received, but a Frame Check Sequence (FCS) not being correct for the response frame on link2. If a channel is idle after the reception of the unsuccessfully received response frame, the non-STR MLD then transmits a fourth frame on link2 at a time of PIFS. In addition, the non-STR MLD transmits a third frame on link1 at a predetermined time (within a time interval) after receiving the first response frame from the STR MLD. In such an example, the non-STR MLD's transmission of the third frame on link1 and the fourth frame on link2 have an aligned transmission start time. Thus, transmission at the predetermined time on link1 may be used because of the possible predetermined margin for the end transmission time alignment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of multi-link communications, the method comprising:
    at a first multi-link device (MLD) that supports a first link, link1, and a second link, link2, transmitting a first frame during a first Transmission Opportunity (TXOP) on link1, and a second frame during a second TXOP on link2, simultaneously to a second MLD;
    receiving, at the first MLD, a first response frame to the first frame transmitted on link1 after a transmission end time of the first frame;
    identifying, at the first MLD, that a response frame to the second frame transmitted on link2 was not received after the transmission end time of the second frame; and
    transmitting, at the first MLD, a third frame on link1 and a fourth frame on link2 simultaneously, after receiving the first response frame on link1.

2. The method of claim 1, wherein the transmission end time of the first frame and the transmission end time of the second frame are within a first predetermined time.

3. The method of claim 1, wherein the third frame is transmitted at a second predetermined time of at least one of SIFS and PIFS after the reception of the first response frame.

4. The method of claim 1, further comprising identifying, at the first MLD, that link2 is idle for a third predetermined time before the transmission of the fourth frame.

5. The method of claim 4, wherein the third predetermined time is Point Coordination Function (PCF) Interframe Space (PIFS).

6. The method of claim 1, wherein transmitting the third frame on link1 and the fourth frame on link2 simultaneously after receiving the first response frame on link1 involves transmitting the third frame and the fourth frame within a predetermined time interval of each other.

7. The method of claim 1, wherein at least the first MLD or the second MLD is operating in synchronous mode operation in response to at least one of the following conditions:
    (i) the first MLD is a Simultaneous Transmit/Receive (STR) MLD and the second MLD is a non-STR MLD; and
    (ii) the first MLD is a non-STR MLD and the second MLD is a STR MLD.

8. The method of claim 1, wherein after transmitting the second frame at the first MLD further involves:
    monitoring, at the first MLD, a wireless medium of link2 to identify link2 as an idle channel.

9. A first multi-link device (MLD), the first MLD comprising:
a processor configured to:
communicate with a second MLD via a first link, link1, and a second link, link2;
transmit a first frame during a first Transmission Opportunity (TXOP) on link1, and a second frame during a second TXOP on link2 simultaneously to a second MLD;
receive a first response frame to the first frame transmitted on link1 a second predetermined time after a transmission end time of the first frame;
identify that a response frame to the second frame transmitted on link2 was not received after the transmission end time of the second frame; and
transmit a third frame on link1 and a fourth frame on link2 simultaneously after receiving the first response frame on link1.

10. The first MLD of claim 9, wherein the transmission end time of the first frame and the transmission end time of the second frame is within a first predetermined time.

11. The first MLD of claim 9, wherein the third frame is transmitted at a second predetermined time of at least one of SIFS and PIFS after the reception of the first response frame.

12. The first MLD of claim 9, wherein the first MLD identifies that link2 is idle for a third predetermined time before the transmission of the fourth frame.

13. The third predetermined time of claim 12, wherein the third predetermined time is Point Coordination Function (PCF) Interframe Space (PIFS).

14. The first MLD of claim 9, wherein transmission of the third frame on link1 and the fourth frame on link2 simultaneously after receiving the first response frame on link1 involves transmitting the third frame and the fourth frame within a predetermined time interval of each other.

15. The first MLD of claim 9, wherein at least the first MLD or the second MLD is operating in synchronous mode operation in response to at least one of:
(i) the first MLD is a Simultaneous Transmit/Receive (STR) MLD and the second MLD is a non-STR MLD; and
(ii) the first MLD is a non-STR MLD and the second MLD is a STR MLD.

16. The first MLD of claim 9, wherein transmission of the second frame at the first MLD further involves, at the first MLD, a monitor of a wireless medium of link2 to identify link2 as an idle channel.

17. A method of multi-link communications, the method comprising:
at a first multi-link device (MLD) that supports a first link, link1, and a second link, link2, transmitting a first frame during a first Transmission Opportunity (TXOP) on link1, and a second frame during a second TXOP on link2 to a second MLD, wherein a transmission end time of Physical Protocol Data Units (PPDUs) carrying the first frame and the second frame is aligned within a first predetermined time, and wherein the first frame solicits a first immediate response frame and the second frame solicits a second immediate response frame;
receiving, at the first MLD, the first immediate response frame on link1;
identifying, at the first MLD, that an immediate response frame to the second frame transmitted on link2 was not received after the transmission end time of the second frame;
transmitting, at the first MLD, a third frame on link1 at a second predetermined time after receiving the first immediate response frame; and
transmitting, at the first MLD, a fourth frame on link2 when the first MLD identifies that link2 is idle.

18. The method of claim 17, wherein transmitting, at the first MLD, the fourth frame on link2 involves at least one of:
(i) transmitting, at the first MLD, the fourth frame on link2 at the second predetermined time after an expected end time of a reception of the second immediate response frame in response to failing to identify, at the first MLD, a start of a PPDU in a third predetermined time after the transmission of the second frame; and
(ii) transmitting, at the first MLD, the fourth frame on link2 a fourth time after the end of a PPDU reception in response to identifying, at the first MLD, the start of the PPDU in the third predetermined time after the transmission of the second frame but failing to recognize, at the first MLD, the second immediate response frame.

19. The method of claim 17, wherein the first, second, third, and fourth predetermined times include at least one of:
(i) the first predetermined time is equal to or less than Short Interframe Space (SIFS);
(ii) the second predetermined time is at least one of SIFS and Point Coordination Function (PCF) Interframe Space (PIFS);
(iii) the third predetermined time is aSIFSTime+aSlotTime+aRxPHYStartDelay; and
(iv) the fourth predetermined time is PIFS.

20. The method of claim 17, wherein at least the first MLD or the second MLD is operating in synchronous mode operation in response to at least one of:
(iii) the first MLD is a Simultaneous Transmit/Receive (STR) MLD and the second MLD is a non-STR MLD; and
(iv) the first MLD is a non-STR MLD and the second MLD is a STR MLD.

* * * * *